United States Patent
Gadat et al.

(10) Patent No.: US 11,032,817 B2
(45) Date of Patent: Jun. 8, 2021

(54) METHOD OF TRANSMISSION, BY A TERMINAL OF A SLOT-BASED ACCESS COMMUNICATION SYSTEM, OF A MESSAGE WITH INTRA-MESSAGE FREQUENCY HOPS

(71) Applicant: AIRBUS DEFENCE AND SPACE SAS, Toulouse (FR)

(72) Inventors: Benjamin Gadat, Toulouse (FR); Vincent Deslandes, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 16/336,299

(22) PCT Filed: Sep. 29, 2017

(86) PCT No.: PCT/EP2017/074894
§ 371 (c)(1),
(2) Date: Mar. 25, 2019

(87) PCT Pub. No.: WO2018/060491
PCT Pub. Date: Apr. 5, 2018

(65) Prior Publication Data
US 2019/0230658 A1   Jul. 25, 2019

(30) Foreign Application Priority Data
Sep. 29, 2016 (FR) ..................... 16 59363

(51) Int. Cl.
*H04W 72/04* (2009.01)
*H04B 1/713* (2011.01)
(Continued)

(52) U.S. Cl.
CPC ........ *H04W 72/0446* (2013.01); *H04B 1/713* (2013.01); *H04B 7/18513* (2013.01);
(Continued)

(58) Field of Classification Search
CPC ... H04W 72/0446; H04W 74/08; H04W 4/06; H04W 4/70; H04W 4/80; H04L 1/004;
(Continued)

(56) References Cited

U.S. PATENT DOCUMENTS

2007/0249328 A1* 10/2007 Jung ..................... H04W 28/16
455/414.1
2008/0267136 A1* 10/2008 Baker ................... H04H 20/72
370/336
(Continued)

FOREIGN PATENT DOCUMENTS

CN        103 220 015 B      1/2015
FR        3 019 957 A1      10/2015
(Continued)

*Primary Examiner* — Hashim S Bhatti
*Assistant Examiner* — Abdullahi Ahmed
(74) *Attorney, Agent, or Firm* — Im IP Law; Chai Im; C. Andrew Im

(57) ABSTRACT

A method for transmitting, by a terminal, a message destined for a receiver station of a wireless communication system. The message being transmitted on a shared channel on which the transmission of messages is performed at the start of predetermined time intervals, termed slots. Data to be included in the message to be transmitted is encoded. The encoded data is distributed between Nb sub-messages of the message to be transmitted, Nb being an integer number greater than or equal to two. A slot is selected for transmitting the message. Nb transmission frequencies are selected, each respectively associated with the Nb sub-messages of the message. The message is transmitted at the start of the selected slot, by successively transmitting the sub-messages on their respective associated transmission frequencies.

14 Claims, 2 Drawing Sheets

Figure 3:
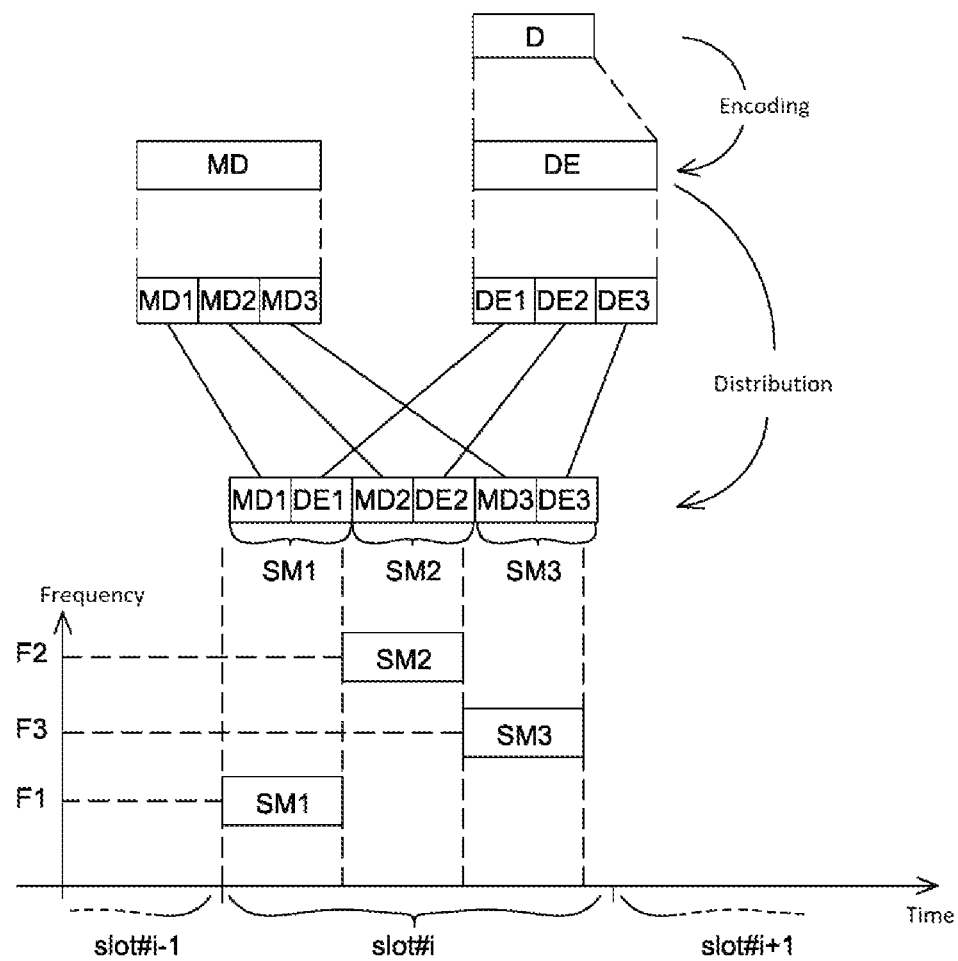

(51) Int. Cl.
*H04L 1/00* (2006.01)
*H04W 4/70* (2018.01)
*H04W 4/06* (2009.01)
*H04W 74/08* (2009.01)
*H04W 4/80* (2018.01)
*H04B 7/185* (2006.01)
*H04J 13/00* (2011.01)
*H04B 1/715* (2011.01)
*H04J 11/00* (2006.01)
*H04L 1/04* (2006.01)

(52) U.S. Cl.
CPC .......... *H04J 13/0029* (2013.01); *H04L 1/004* (2013.01); *H04L 1/0061* (2013.01); *H04W 4/06* (2013.01); *H04W 4/70* (2018.02); *H04W 4/80* (2018.02); *H04W 74/08* (2013.01); *H04B 2001/7154* (2013.01); *H04J 2011/0016* (2013.01); *H04L 1/04* (2013.01)

(58) Field of Classification Search
CPC ...... H04L 1/0061; H04L 1/04; H04J 13/0029; H04J 2011/0016; H04B 7/18513; H04B 1/713; H04B 2001/7154
See application file for complete search history.

(56) References Cited

U.S. PATENT DOCUMENTS

| | | | |
|---|---|---|---|
| 2009/0196273 A1* | 8/2009 | Kwon | H04W 8/30 370/343 |
| 2010/0254431 A1* | 10/2010 | Derr | H04B 1/713 375/133 |
| 2011/0255570 A1 | 10/2011 | Fujiwara | |
| 2015/0245341 A1* | 8/2015 | Grant | H04B 7/18539 370/336 |
| 2015/0282008 A1* | 10/2015 | Cao | H04L 1/0003 370/310 |
| 2017/0041826 A1 | 2/2017 | Hersent | |
| 2017/0070324 A1* | 3/2017 | Kahtava | H04L 5/0044 |
| 2018/0054815 A1 | 2/2018 | Zirphile et al. | |
| 2018/0062803 A1 | 3/2018 | Zirphile et al. | |
| 2019/0181910 A1* | 6/2019 | Goto | H04B 1/7103 |

FOREIGN PATENT DOCUMENTS

WO 2016/139408 A1 6/2016
WO 2016/132081 A1 8/2016

* cited by examiner

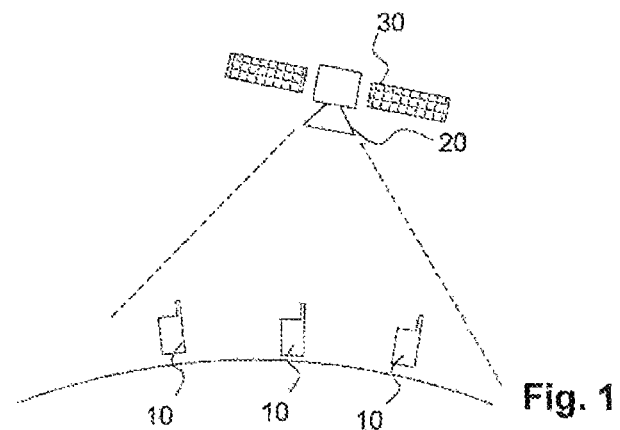
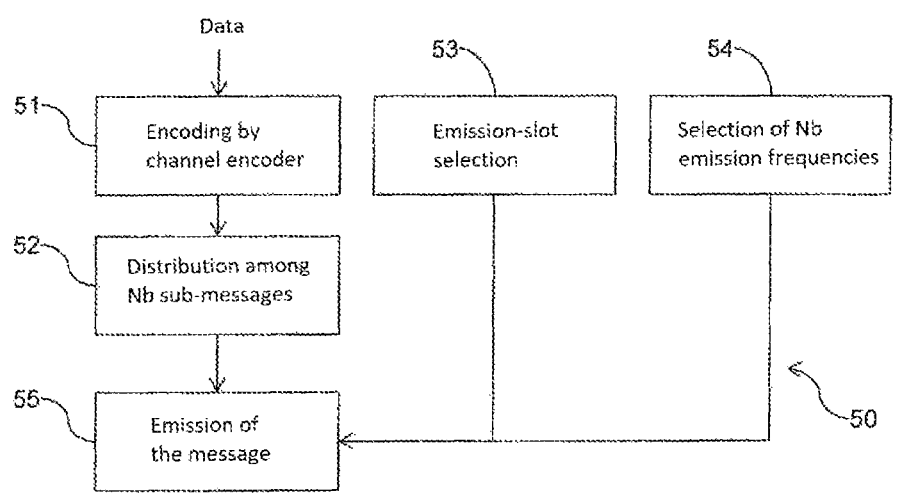

METHOD OF TRANSMISSION, BY A TERMINAL OF A SLOT-BASED ACCESS COMMUNICATION SYSTEM, OF A MESSAGE WITH INTRA-MESSAGE FREQUENCY HOPS

RELATED APPLICATIONS

This application is a § 371 application of PCT/EP2017/074894 filed Sep. 29, 2017, which claims priority from French Patent Application No. 16 59363 filed Sep. 29, 2016, each of which is incorporated herein by reference in its entirety.

TECHNICAL FIELD

The present invention belongs to the field of wireless communication systems, and relates more particularly to a protocol for access, by a terminal, to a channel shared with other terminals in order to communicate with a receiver station.

BACKGROUND OF THE INVENTION

The present invention has a particularly advantageous but in no way limiting use in the case of a system for communication by a satellite in Earth orbit.

In satellite communication systems, numerous protocols for access to a shared channel are known.

In particular, in the ALOHA protocol, the access is random, and each terminal randomly selects the time of emission of a message. With such an approach, collisions between messages emitted by different terminals can occur, and the ALOHA protocol also aims to introduce mechanisms allowing to resolve the collisions.

The ALOHA protocol gave rise to numerous evolutions, and in particular the evolution known under the name of "Slotted ALOHA", in which the emission time, still selected randomly by each terminal, can only have a certain number of discrete values, which correspond to the beginning times of predetermined time intervals, called "slots". The Slotted ALOHA protocol allows, with respect to the ALOHA protocol, to improve the use capacity of the shared channel.

An evolution of the Slotted ALOHA protocol, known under the name of CRDSA ("Contention Resolution Diversity Slotted ALOHA"), is for example implemented in the standard DVB-RCS2. In the CRDSA protocol, the same message is replicated multiple times, and each replica of this same message is emitted at the beginning of a slot selected randomly, all the replicas being emitted in a window comprising a predetermined number $N_S$ of slots ($N_S$ being greater than the number of replicas).

At present, it is possible to collect, from satellites in Earth orbit, messages emitted by terrestrial or aerial connected objects. Given that numerous objects in daily life are destined to become connected objects, numerous connected objects will be liable to try to access the shared channel substantially at the same time. It is thus understood that, even when randomly selecting the emission time of a message, it will be possible for numerous collisions to occur.

In order to resolve these collisions, it is for example possible to implement, in the receiver station, well-known techniques of interference cancellation. In particular, the technique of successive interference cancellation ("Successive Interference Cancellation" or SIC) allows to resolve certain collisions, that is to say, allows to decode messages even in the presence of collisions.

However, in the case of a collection of messages emitted by connected object, the number of collisions, in the case of the existing access protocols, is potentially so large that numerous messages may be lost, even when applying interference cancellation techniques.

OBJECT AND SUMMARY OF THE INVENTION

The goal of the present invention is to overcome all or a portion of the limitations of the solutions of the prior art, in particular those disclosed above, by proposing a protocol for access to a shared channel that allows to reduce the duration of collision between two given messages.

For this purpose, and according to a first aspect, the present invention relates to a method for emission, by a terminal, of a message to a receiver station of a wireless communication system, said terminal being time synchronised with said receiver station, wherein said message is to be emitted over a channel shared with other terminals and on which the emission of messages to said receiver station is carried out at the beginning of time intervals predetermined for the terminal and the receiver station, called "slots". Said emission method comprises:
  an encoding of data to be included in the message to be emitted by means of a channel encoder,
  a distribution of the encoded data among Nb sub-messages of the message to be emitted, by fragmentation of said encoded data into Nb fragments, Nb being an integer greater than or equal to two,
  a selection of a slot for the emission of said message,
  a selection of Nb emission frequencies, respectively associated with the Nb sub-messages of the message,
  an emission of the message at the beginning of the selected slot, by successively emitting the sub-messages on their respective associated emission frequencies.

Thus, the data to be emitted in a message is encoded by means of a channel encoder, and the encoded data is fragmented into Nb fragments in order to form Nb different respective sub-messages forming the message to be emitted. The sub-messages forming said message are then successively emitted on different respective emission frequencies.

In other words, in the access protocol thus defined, the emission of a message can be carried out only at predetermined times, corresponding to the beginning of slots, and said emission further comprises intra-message emission frequency hops.

On the one hand, because the emission frequency varies from one sub-message to another of the same message, the probability of having, between two messages emitted by two different terminals, collisions over a plurality of sub-messages is greatly reduced.

On the other hand, the fact that the encoded data is distributed into different sub-messages allows to use the frequency diversity introduced by intra-message emission frequency hops, which allows to improve the decoding of the message in the presence of partial collisions that only concern certain sub-messages.

In specific modes of implementation, the emission method can further comprise one or more of the following features, taken alone or in any technically possible combination.

In specific modes of implementation, each frequency of emission of a sub-message is selected randomly by said terminal inside a predetermined frequency band.

In specific modes of implementation, the emission method comprises an insertion, only in the sub-message to be emitted first on the channel, of a predetermined detection pattern.

In specific modes of implementation, the emission method comprises a fragmentation of a predetermined detection pattern into Nb fragments of the detection pattern, each fragment of the detection pattern being included in one of the sub-messages of the message to be emitted.

In specific modes of implementation, the detection pattern is a Gold sequence.

In specific modes of implementation, the message is entirely emitted inside the selected slot.

In specific modes of implementation, each sub-message is an ultra-narrow-band signal.

According to a second aspect, the present invention relates to a terminal for the emission of a message to a receiver station of a wireless communication system, wherein said message is to be emitted over a channel shared with other terminals and on which the emission of messages to said receiver station is carried out at the beginning of predetermined time intervals, called "slots". Said terminal comprises:
- means configured to encode data to be included in the message to be emitted,
- means configured to distribute the encoded data among Nb sub-messages of the message to be emitted, Nb being an integer greater than or equal to two,
- means configured to select a slot for the emission of said message,
- means configured to select Nb emission frequencies, respectively associated with the Nb sub-messages of the message,
- means configured to emit the message at the beginning of the selected slot, by successively emitting the sub-messages on their respective associated emission frequencies.

According to a third aspect, the present invention relates to a wireless communication system comprising at least one receiver station and a plurality of terminals according to any one of the embodiments of the invention.

In preferred embodiments, the receiver station is on board a satellite in Earth orbit.

PRESENTATION OF THE FIGURES

The invention will be better understood upon reading the following description, given as an example that is in no way limiting, and made in reference to the figures which show:

FIG. 1: a diagram of an example of realisation of a wireless communication system, FIG. 2: a diagram showing the main steps of a method for emission of a message over a shared channel, FIG. 3: an illustration of the succession of the various steps of a specific example of implementation of the emission method of FIG. 2.

In these figures, references identical from one figure to another designate identical or analogous elements. For reasons of clarity, the elements shown are not to scale, unless otherwise mentioned.

DETAILED DESCRIPTION OF EMBODIMENTS

FIG. 1 schematically shows an example of realisation of a wireless communication system comprising a plurality of terminals 10 and a receiver station 20.

In the rest of the description, and as illustrated by FIG. 1, the case is considered, in a non-limiting manner, in which the receiver station 20 is on board a satellite 30 in Earth orbit, and in which the terminals 10 are located substantially on the surface of the Earth. "Substantially on the surface of the Earth" means that each terminal 10 is on the ground (terrestrial or marine), or at an altitude in the Earth's atmosphere (on board an airplane, a drone, a balloon, etc.). Nothing, however, excludes, according to other examples, having for example a receiver station on board a spacecraft or aircraft (airplane, drone, balloon, etc.). The receiver station can also, according to other examples, be on the ground (terrestrial or marine).

The satellite 30 is preferably in LEO ("Low Earth Orbit") low-altitude orbit. Nothing, however, excludes considering other types of orbits, for example an MEO ("Medium Earth Orbit") medium-altitude orbit, a GEO ("Geostationary Orbit") geostationary orbit, etc.

Each terminal 10 can emit messages over a channel to the receiver station 20. The channel between the terminals 10 and the receiver station 20 corresponds to a predetermined frequency band, shared by all of the terminals 10. It should be noted that this frequency band, forming the shared channel, can consist of a single continuous range of frequencies or, alternatively, of a plurality of continuous ranges of frequencies disjointed with respect to one another.

The emission of messages over the shared channel, to the receiver station 20, is carried out only at the beginning of predetermined time intervals, called "slots". Such an approach requires, in a known manner, to ensure time synchronisation between the terminals 10 and the receiver station 20. The means implemented in order to ensure this time synchronisation are considered to be known to a person skilled in the art and are outside of the scope of the present invention.

"Emit at the beginning of a slot" means that the terminal 10 seeks to begin its emission at a predetermined time, a slot being defined as a time interval defined by two consecutive possible emission times. However, it is not necessary for the emission of a message to begin exactly at the beginning of a slot. This depends in particular on the precision of the time synchronisation between the terminals 10 and the receiver station 20, on the taking into account or not of the time of propagation between a terminal 10 and the receiver station 20 on board the satellite 30 (in order to ensure that the message emitted is received at a predetermined time), etc.

Excluding the constraint regarding the emission of messages only at the beginning of predetermined slots, the terminals 10 preferably unilaterally determine when to emit messages. In other words, the receiver station 20 does not know a priori whether it is liable to receive a message from a given terminal 10, said receiver station only knows that, if it has to receive a message from this terminal 10 or from another, this can only occur at predetermined instant.

FIG. 2 shows the main steps of a method 50 for emission, by a terminal 10, of a message over the shared channel to the receiver station 20. As illustrated by FIG. 2, the emission method 50 mainly comprises steps of:
- 51 encoding of data to be included in the message to be emitted by means of a channel encoder,
- 52 distribution of the encoded data among Nb sub-messages of the message to be emitted, Nb being an integer greater than or equal to two,
- 53 selection of a slot for the emission of said message,
- 54 selection of Nb emission frequencies, respectively associated with the Nb sub-messages of the message, 55 emission of the message at the beginning of the selected slot, by successively emitting the sub-messages on their respective associated emission frequencies.

Thus, the data to be emitted in a message is encoded by means of a channel encoder, having an encoding ratio R (R<1), and the encoded data is distributed into Nb different sub-messages forming the message to be emitted. The sub-messages forming said message are then successively emitted on different respective emission frequencies, carrying out intra-message emission frequency hops.

Indeed, this decomposition of the message into Nb sub-messages is carried out by the physical layer protocol used for the exchange of data between the terminal 10 and the receiver station 20, in such a way that the emission frequency varies within the same message, independently of knowing whether said emission frequency further varies from one message to another. It should also be noted that all the steps shown in FIG. 2 are steps carried out in the context of said physical layer protocol.

Preferably, the channel encoder and the distribution of the encoded data into the various sub-messages are such that it is always possible to decode the data from (Nb−1) given sub-messages among the Nb sub-messages, in the absence of noise and/or interference. In order to not have an encoding ratio R that is too low, the channel encoder and the distribution of the encoded data into the various sub-messages are such that it is not possible to decode the data from a single sub-message, even in the absence of noise and interference. The encoding ratio R is thus preferably strictly greater than 1/Nb (R>1/Nb). In preferred modes of implementation, the number Nb of messages is greater than or equal to three, and the encoding ratio R is strictly greater than 1/Nb and less than or equal to (Nb−1)/Nb.

In the rest of the description, the case is considered, in a non-limiting manner, in which Nb is equal to three (Nb=3). The channel encoder and the distribution of the encoded data into the various sub-messages are such that it is always possible to decode the data from two given sub-messages out of the three (Nb=3) sub-messages, and such that it is not possible to decode the data from a single sub-message.

The various steps illustrated by FIG. 2 are preferably all carried out by the terminal 10.

For example, the terminal 20 comprises for this purpose a processing circuit (not shown in the drawings), comprising one or more processors and memorisation means (magnetic hard disk, solid-state disk, optical disk, etc.) in which a computer program product is memorised, in the form of a set of program-code instructions to be executed in order to implement all or a portion of the steps of the method 50 for emission of messages. Alternatively or in addition, the processing circuit comprises one or more programmable logic circuits (FPGA, PLD, etc.), and/or one or more specialised integrated circuits (ASIC), and/or a set of discrete electronic components, etc., adapted for implementing all or a portion of said steps of the method 50 for emission of messages.

The terminal 20 also comprises wireless communication means, implemented during the step 55 of emission, allowing said terminal 10 to emit the messages in the form of radioelectric signals. The wireless communication means are conventionally in the form of a radioelectric circuit comprising equipment (antenna, amplifier, local oscillator, mixer, analogue filter, etc.) considered to be known to a person skilled in the art.

In other words, the processing circuit and the radioelectric circuit of the terminal 10 form a set of means configured by software (specific computer program product) and/or by hardware (FPGA, PLD, ASIC, discrete electronic components, etc.) to implement all of the steps of the method 50 for emission of messages. These means in particular realise a channel encoder, a distributor of the data, a slot selector, an emission-frequency selector and an emitter of sub-messages.

During the step 51, the data to be included in the message is encoded by means of a channel encoder. The channel encoder is part of the processing of the physical layer protocol used for the communications between the terminal 10 and the receiver station 20, and the data to be encoded corresponds to a service-data unit ("Service Data Unit" or SDU) received from the protocol layer located above the physical layer.

In general, any type of channel encoder known to a person skilled in the art can be implemented during the step 51 of encoding, and the choice of a particular channel encoder is merely an alternative of implementation of the invention. In preferred modes of implementation, the channel encoder corresponds to a turbo code. Nothing, however, excludes, according to other examples, considering other types of channel encoders, and/or considering a combination of different channel encoders. In particular, it is possible, according to alternatives of the invention, to consider a channel encoder implementing an LDPC ("Low Density Parity Check") code, a convolutional code, etc.

During the step 52, the data encoded is distributed among Nb sub-messages. It should be noted that this step 52 of distribution can consist of a simple fragmentation of the encoded data or, in preferred modes of implementation, can further comprise, in particular, an interleaving of the encoded data before fragmentation. Preferably, each sub-message comprises the same quantity of encoded data. In such a case, if the number of pieces of encoded data obtained after the step 51 of encoding is equal to Nc, then the number of pieces of encoded data included in each sub-message is equal to Nc/Nb. Nothing, however, excludes, according to other examples, distributing the encoded data in such a way that the sub-messages do not all comprise the same quantity of said pieces of encoded data and do not necessarily all have the same duration during their emission. Preferably, the respective durations of the sub-messages are known a priori to or can be determined by the receiver station 20 or by a piece of equipment tasked with the extraction.

During the step 53, the terminal 10 selects a slot for the emission of the message. The slot to be used, out of the possible slots, is for example selected randomly by said terminal 10. In general, any method for selecting a slot can be implemented, and the choice of a particular method merely corresponds to an alternative of implementation of the invention.

During the step 54, the terminal 10 selects Nb emission frequencies, respectively associated with the Nb sub-messages forming the message to be emitted over the shared channel.

Preferably, the Nb emission frequencies are all different. Nothing, however, excludes, according to other examples of implementation, having certain equal emission frequencies, as long as the Nb emission frequencies are not all identical. In preferred modes of implementation, the emission frequencies are selected, in each terminal 10, randomly. In such a case, it is understood that the Nb emission frequencies selected are not known a priori to the receiver station 20. By thus selecting the Nb emission frequencies, for two distinct terminals 10 having selected the same emission frequency for a sub-message, the probability of again selecting the same emission frequency for the following sub-message is low. Nothing, however, excludes, according to other examples, using, for a given terminal 10, a predetermined sequence of emission frequency hops, preferably known a priori to or capable of being determined by the receiver station 20 or by a piece of equipment tasked with the extraction of the data included in the messages received by said receiver station 20, said sequence of emission frequency hops further being different than the sequences of emission frequency hops of the other terminals 10.

In the case in which the emission frequencies are selected randomly, and are not therefore known a priori by the receiver station 20 or by a piece of equipment tasked with the extraction, it is possible, in order to facilitate the extraction of the data, to include in each sub-message a piece of control information allowing to determine the emission frequency of the following sub-message (and/or of the previous sub-message, and/or of all the other sub-messages, etc.).

Then, during the step 55, the message is emitted at the beginning of the selected slot, by successively emitting the sub-messages on their respective associated emission frequencies.

FIG. 3 schematically shows the succession of the various steps of the emission method 50, starting from data D to be included in a message.

As illustrated by FIG. 3, the data D is encoded in order to obtain encoded data DE. In a well-known manner, a channel encoder adds redundancy to the data, and the number Nc of pieces of encoded data is greater than the number of pieces of data D to be included in the message.

The encoded data DE is then distributed into Nb sub-messages. In the non-limiting example illustrated by FIG. 3, Nb is equal to three (Nb=3) and the sub-messages are designated by respectively SM1, SM2 and SM3. Moreover, in the example illustrated by FIG. 3, the distribution mainly consists of a fragmentation of the encoded data DE into Nb fragments, designated by respectively DE1, DE2 and DE3.

In general, control information, allowing to facilitate the detection and/or the extraction of the data from the message, can also be included in at least one of the sub-messages. In the example illustrated by FIG. 3, the control information comprises a detection pattern MD, allowing to facilitate the detection of the message emitted. The detection pattern MD is preferably the same for all the terminals 10, but nothing excludes considering various detection patterns associated with various terminals 10. Preferably, the detection pattern MD is a pattern having good correlation properties, such as a Gold sequence. In the example illustrated by FIG. 3, the detection pattern is fragmented into Nb fragments, designated by respectively MD1, MD2 and MD3:

the fragment MD1 of the detection pattern MD is included in the sub-message SM1 with the fragment DE1 of the encoded data, the fragment MD2 of the detection pattern MD is included in the sub-message SM2 with the fragment DE2 of the encoded data, the fragment MD3 of the detection pattern MD is included in the sub-message SM3 with the fragment DE3 of the encoded data.

Nothing, however, excludes, according to other examples, emitting the detection pattern MD entirely in the same sub-message of the message emitted, for example in the sub-message SM1.

Because the detection pattern MD is fragmented, or included entirely in a single sub-message of the message emitted, it is understood that the quantity of control information included in order to facilitate the detection of the message is not increased with respect to a physical layer protocol according to the prior art not comprising intra-message frequency hops.

Nothing, however, excludes, according to other examples, including a predefined detection pattern in each sub-message, preferably different from one sub-message to another in order to allow to more easily distinguish the various sub-messages of the message emitted.

The message is then emitted at the beginning of the selected slot (designated by "slot #i" in FIG. 3), by successively emitting the sub-messages SM1, SM2 and SM3 on the emission frequencies selected during the step 54, designated by respectively F1, F2 and F3 in FIG. 3.

In the example illustrated by FIG. 3, the sub-message SM2 is emitted immediately after the sub-message SM1, and the sub-message SM3 is emitted immediately after the sub-message SM2. Nothing, however, excludes, according to other examples, introducing an interval of silence between two consecutive sub-messages. Preferably, the time gap between the times of beginning of emission of two consecutive sub-messages are predetermined, known a priori to or capable of being determined by the receiver station 20 or by a piece of equipment tasked with the extraction. This time gap is for example constant over time and the same for all the consecutive sub-messages. According to another example, each sub-message can comprise a piece of control information allowing to determine when the following sub-message (and/or the previous sub-message, and/or all the other sub-messages, etc.) is liable to be received, in order to facilitate the detection thereof.

In the example illustrated by FIG. 3, the message emitted has a duration smaller than the duration of a slot, in such a way that the sub-messages SM1, SM2 and SM3 are all emitted within the slot #i selected. Thus, the emission frequency hops are both intra-message and intra-slot. Nothing, however, excludes, according to other examples, having a message having a duration greater than that of the selected slot. In such a case, the emission of the message continues at least over the slot that follows the selected slot. For example, the message is emitted in such a way that each sub-message is emitted at the beginning of a slot. In the example illustrated by FIG. 3, this would mean emitting the sub-message SM1 at the beginning of the selected slot #i, then the sub-message SM2 at the beginning of the slot #i+1, then the sub-message SM3 at the beginning of the slot #i+2. However, preferably, the sub-messages are emitted in such a way that only the first sub-message is emitted at the beginning of a slot.

The extraction of the data received in one or more messages is carried out by the receiver station 20 and/or by a piece of equipment, such as a ground station, to which the receiver station 20 transmits the messages received in any adapted form. The extraction of the data from a received message can implement any adapted method known to a person skilled in the art and is beyond the context of the invention.

As indicated above, it is possible to integrate control information allowing to facilitate the detection and/or the extraction of the data of a message. In particular, the control information allowing to determine the emission frequencies and/or the emission times of the various sub-messages of the same message allow to more easily identify the sub-messages belonging to the same message. Other types of control information are also possible for identifying the sub-messages belonging to the same message, for example such as including in each sub-message a sequence number of the message and/or an identifier of the terminal having emitted said message. Alternatively or in addition, the sub-messages belonging to the same message can be identified by evaluating the coherence of certain physical parameters of the sub-messages detected. For example, if the time gaps between consecutive sub-messages of the same message are known a priori, only sub-messages having detection times that verify these time gaps are liable to belong to the same message. Moreover, sub-messages belonging to the same message are subjected substantially to the same propagation conditions, in such a way that they are in principle coherent in terms of phase and are received with substantially the same power. By comparing the phases and/or the reception powers of the sub-messages detected, it is therefore also possible to identify the sub-messages that are liable to belong to the same message, even when no control information has been included in the sub-messages.

The above description clearly illustrates that by its various features and their advantages, the present invention reaches the goals set for it. In particular, because the data to be emitted in a message is encoded and distributed into a plurality of sub-messages that are emitted on different emission frequencies, the maximum duration of collision between two given messages is greatly reduced with respect to the prior art, in such a way that the collision between these two messages is easier to resolve. Consequently, the receiver station 20 can detect a greater number of messages received simultaneously.

Moreover, because the decomposition into sub-messages is carried out in the physical layer and not in a higher level such as the layer of access to the medium ("Medium Access Control" or MAC), said decomposition can be advantageously carried out by inserting less control information than in the case of a decomposition in a higher layer. Such a decomposition in the physical layer can even, in preferred modes of implementation, be carried out without adding control information with respect to a physical layer protocol according to the prior art not comprising intra-message frequency hops.

The present invention has a particularly advantageous, although in no way limiting, use in the case in which each sub-message is an ultra-narrow-band signal. "Ultra-narrow-band" ("Ultra Narrow Band" or UNB) means that the instantaneous frequency spectrum of each sub-message has a frequency width of less than two kilohertz, or even less than one kilohertz. Indeed, the invention can then be implemented without having to consider a shared channel having a frequency width that is too great, and can be implemented with a shared channel having a frequency width that is approximately several tens of kilohertz to several hundred kilohertz.

The invention claimed is:

1. A method for emission, by a terminal, of a message to a receiver station of a wireless communication system, the terminal being time synchronized with the receiver station, the message emitted over a channel shared with other terminals and on which the emission of messages to the receiver station is carried out at beginning of predetermined time intervals for the terminal and the receiver station, called predetermined slots, and the method comprising:
encoding data to be included in the message to be emitted by a channel encoder;
distributing the encoded data among Nb sub-messages of the message to be emitted, by fragmenting the encoded data into Nb fragments, Nb being an integer greater than or equal to two;
randomly selecting a slot, among the predetermined slots, for the emission of the message by the terminal;
selecting Nb emission frequencies, respectively associated with the Nb sub-messages, by the terminal, wherein the Nb emission frequencies are not known a priori to the receiver station; and
emitting the message at the beginning of the selected slot, by successively emitting the sub-messages on their respective associated emission frequencies.

2. The method according to claim 1, wherein each frequency of emission of a sub-message is selected randomly by the terminal inside a predetermined frequency band.

3. The method according to claim 1, further comprising inserting, only in the sub-message to be emitted first on the channel, a predetermined detection pattern.

4. The method according to claim 1, further comprising fragmenting a predetermined detection pattern into Nb fragments of the detection pattern, each fragment of the detection pattern being included in one of the sub-messages of the message to be emitted.

5. The method according to claim 3, wherein the detection pattern is a Gold sequence.

6. The method according to claim 4, wherein the detection pattern is a Gold sequence.

7. The method according to claim 1, wherein the message is entirely emitted inside the selected slot.

8. The method according to claim 1, wherein each sub-message is an ultra-narrow-band signal.

9. A terminal to emit a message to a receiver station of a wireless communication system, the message being emitted over a channel shared with other terminals and on which the emission of messages to the receiver station is carried out at beginning of predetermined time intervals, called predetermined slots, the terminal comprising a processing circuit configured to:
encode data to be included in the message to be emitted;
distribute the encoded data among Nb sub-messages of the message to be emitted, Nb being an integer greater than or equal to two;
randomly select a slot, among the predetermined slots, to emit the message;
select Nb emission frequencies, respectively associated with the Nb sub-messages of the message, wherein the Nb emission frequencies are not known a priori to the receiver station; and
emit the message at the beginning of the selected slot, by successively emitting the sub-messages on their respective associated emission frequencies.

10. A terminal to emit a message to a receiver station of a wireless communication system, the message being emitted over a channel shared with other terminals and on which the emission of messages to the receiver station is carried out at beginning of predetermined time intervals, called slots, the terminal comprising:
a channel encoder encodes data to be included in the message to be emitted;
a data distributor distributes the encoded data among Nb sub-messages of the message to be emitted, Nb being an integer greater than or equal to two;
a slot selector randomly selects a slot, among the predetermined slots, to emit the message,
an emission-frequency selector selects Nb emission frequencies, respectively associated with the Nb sub-messages of the message, wherein the Nb emission frequencies are not known a priori to the receiver station; and an emitter transmits the message at the beginning of the selected slot, by successively emitting the sub-messages on their respective associated emission frequencies.

11. A wireless communication system comprising at least one receiver station and a plurality of terminals according to claim 10.

12. A system according to claim 11, wherein the receiver station is on board a satellite in Earth orbit.

13. A wireless communication system comprising at least one receiver station and a plurality of terminals according to claim 9.

14. A system according to claim 13, wherein the receiver station is on board a satellite in Earth orbit.

* * * * *